United States Patent [19]

Puryear

[11] 4,344,586

[45] Aug. 17, 1982

[54] DRAG SPRING FOR FISHING REEL

[75] Inventor: John W. Puryear, Tulsa, Okla.

[73] Assignee: Brunswick Corporation, Skokie, Ill.

[21] Appl. No.: 278,178

[22] Filed: Jun. 29, 1981

Related U.S. Application Data

[63] Continuation of Ser. No. 136,379, Apr. 1, 1980, abandoned, which is a continuation of Ser. No. 932,845, Aug. 11, 1978, abandoned.

[51] Int. Cl.³ ............................................. A01K 89/02
[52] U.S. Cl. ................................ 242/84.5 A; 188/83; 267/161
[58] Field of Search ..................... 242/84.2 R, 84.2 A, 242/84.21 R, 84.5 A, 84.5 R, 84.51 R, 84.51 A; 188/83; 267/161, 162, 181

[56] References Cited

U.S. PATENT DOCUMENTS

| | | | |
|---|---|---|---|
| 2,739,767 | 3/1956 | Dunkelberger et al. | 242/84.2 R |
| 2,863,617 | 12/1958 | Chapin et al. | 242/84.5 A |
| 3,874,610 | 4/1975 | Wahberg | 242/84.21 R |

Primary Examiner—Billy S. Taylor
Attorney, Agent, or Firm—John G. Heimovics

[57] ABSTRACT

The invention comprehends a unique spring used in a free-floating drag mechanism on a conventional spinning reel and a skirted style spinning reel. The spring comprises first a long leaf and then a short leaf spring which give linear responses for both portions. The spring is deeply mounted within the fishing reel and therefore is not subject to the corrosive atmosphere that standard drag mechanisms with standard springs are exposed to.

1 Claim, 12 Drawing Figures

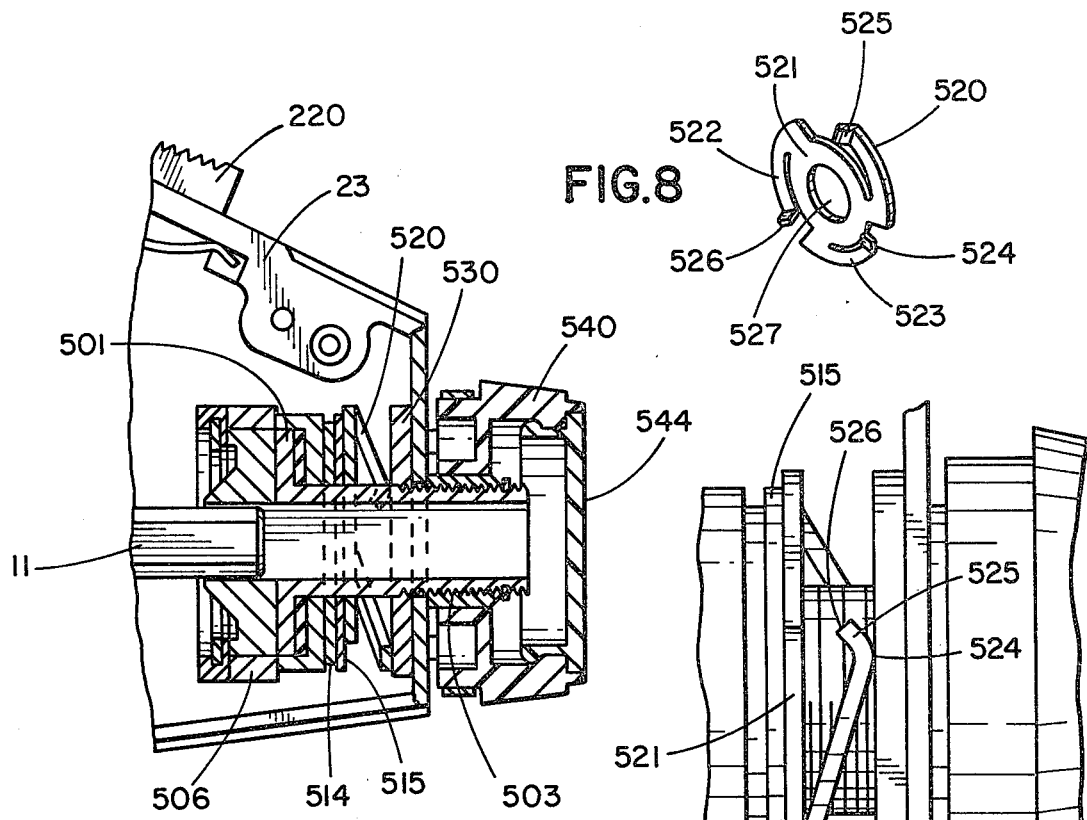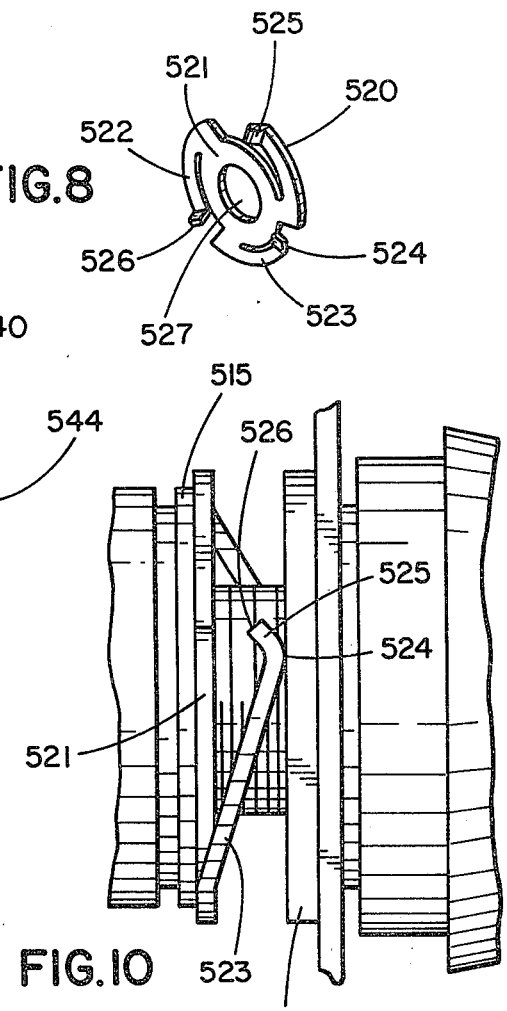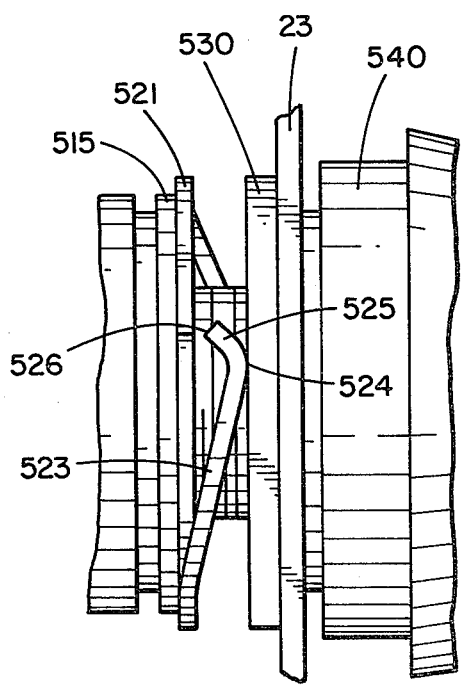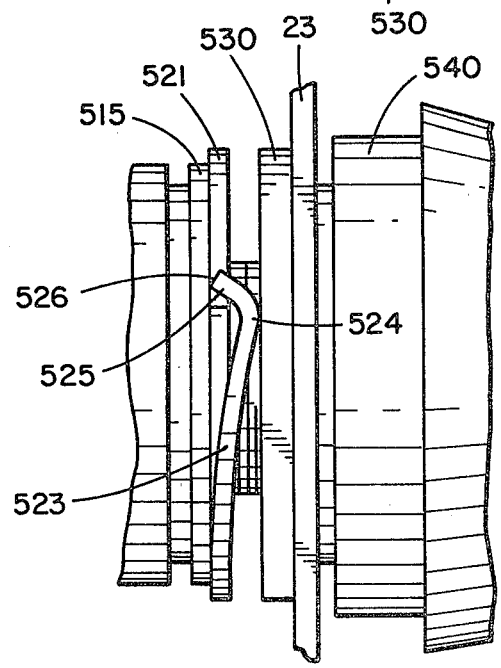

4,344,586

DRAG SPRING FOR FISHING REEL

This is a continuation of application Ser. No. 136,379, filed on Apr. 1, 1980, now abandoned, which was a continuation of application Ser. No. 932,845, filed Aug. 11, 1978, now abandoned.

BACKGROUND OF THE INVENTION

1. Field of the Invention

This invention relates to conventional spinning reels and skirted spinning reels, and more particularly, relates to the use of a unique style of free-floating drag that incorporates a unique drag spring.

2. Background of the Prior Art

It is well known in the prior art that in most conventional and skirted style spinning reels the drag mechanism is incorporated in the hub of the front spool of the fishing reel. This spool is mounted on the center shaft by the use of a front nut. The line that is wound on the spool is in close association with the drag mechanism and therefore the corrosive material that is picked up by the fishing line when it is in the water comes into close contact with the drag mechanism. It has also been found that the conventional style of drag mechanism mounted in the fishing reel spool does not have a linear response with respect to the compressive force applied thereto. Unfortunately, the prior art does not describe how it is possible to utilize a free-floating drag mechanism located away from the spool with a spring that is capable of producing a linear response.

SUMMARY OF THE INVENTION

This invention relates to conventional spinning reels and skirted style spinning reels that incorporate a free-floating drag mechanism mounted at the back of the housing of the reel. In order for this drag mechanism to operate properly, a spring is utilized therein. Briefly, the drag mechanism operates in a fashion whereby two friction plates are clamped on a drag cup which is indirectly keyed to the fishing reel shaft. As the clamping force utilizing a unique spring causes the friction discs to clamp on the drag cup, the drag cup's rotation is limited. This limited rotation provides that the spool rotates at the same rate.

It is therefore an object of this invention to provide a free-floating drag mechanism that has incorporated therein a unique style of drag spring.

It is another object of this invention to provide a drag spring whereby it has a multi-sectioned leaf spring all leaves having linear spring responses.

Another object of the invention is the provision for such a drag spring which provides for a smoothly operating drag system and a smooth transition from the long leaf spring portion to the short leaf spring portion.

Yet another object of this invention is the provision for such a drag spring that has three radial arms acting as springs spaced approximately 120° apart.

The above and other and further objects and features will be more readily understood by reference to the following detailed description and the accompanying drawings.

DESCRIPTION OF THE DRAWINGS

FIG. 8 is a perspective view of the embodiment of the drag spring of this invention;

FIG. 9 is a partial cross section of the back portion of the fishing reel showing the embodiment of this invention;

FIG. 10 is an enlarged cutaway sectional view of the back portion of the fishing reel depicting the drag spring with the drag slightly tightened;

FIG. 11 is an enlarged cutaway sectional view similar to FIG. 10 showing the drag fairly well tightened; and, FIG. 12 is an enlarged cutaway sectional view similar to FIG. 10 and 11 showing the drag extremely tightened with the second part of the drag spring in operation.

DESCRIPTION OF THE PREFERRED EMBODIMENTS

Figure 1:
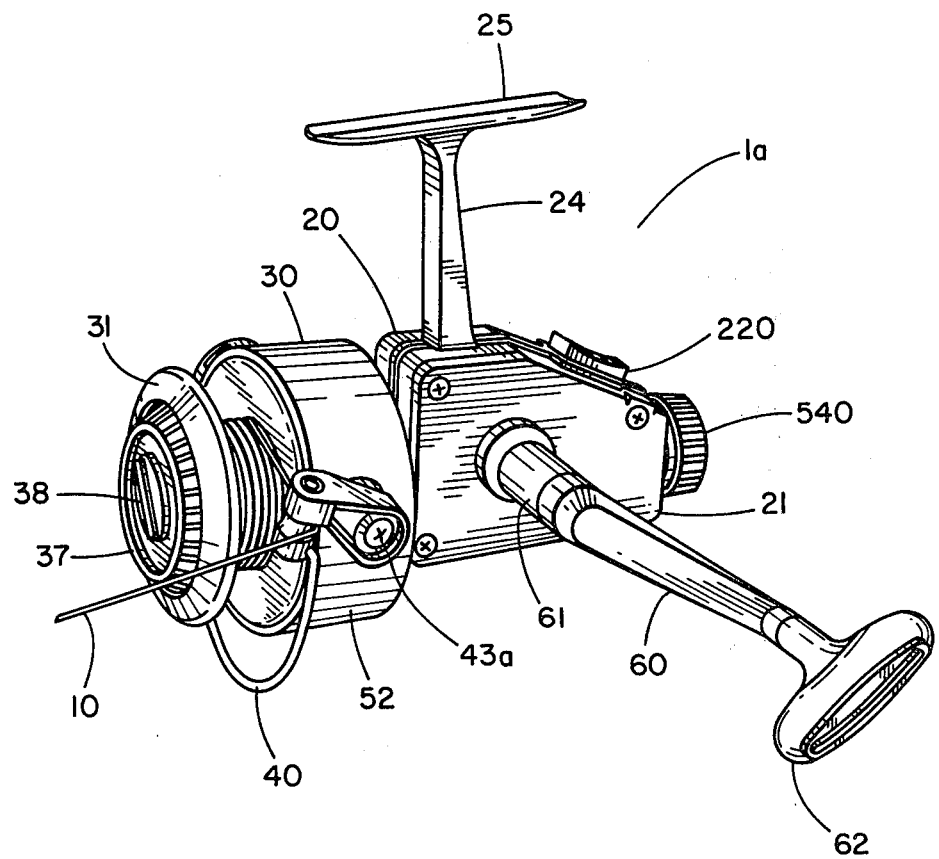
FIG. 1 is a perspective view of the conventional style spinning reel containing the invention described herein.
Figure 2:
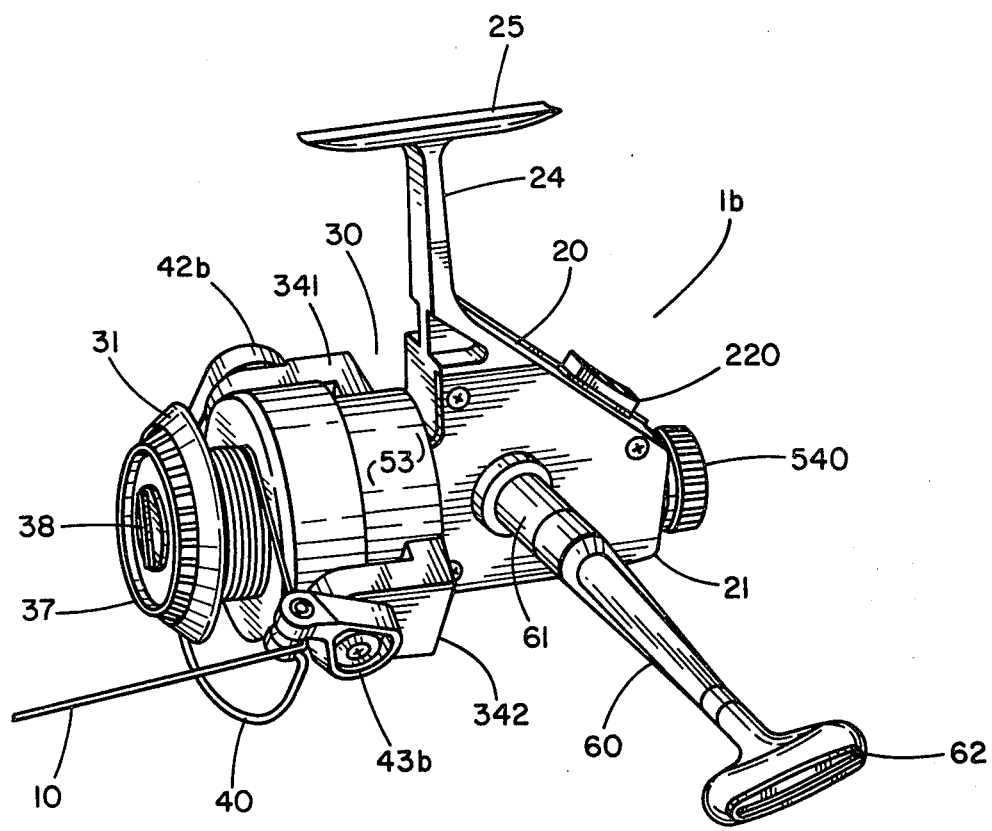
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about the crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably, permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Figure 3:
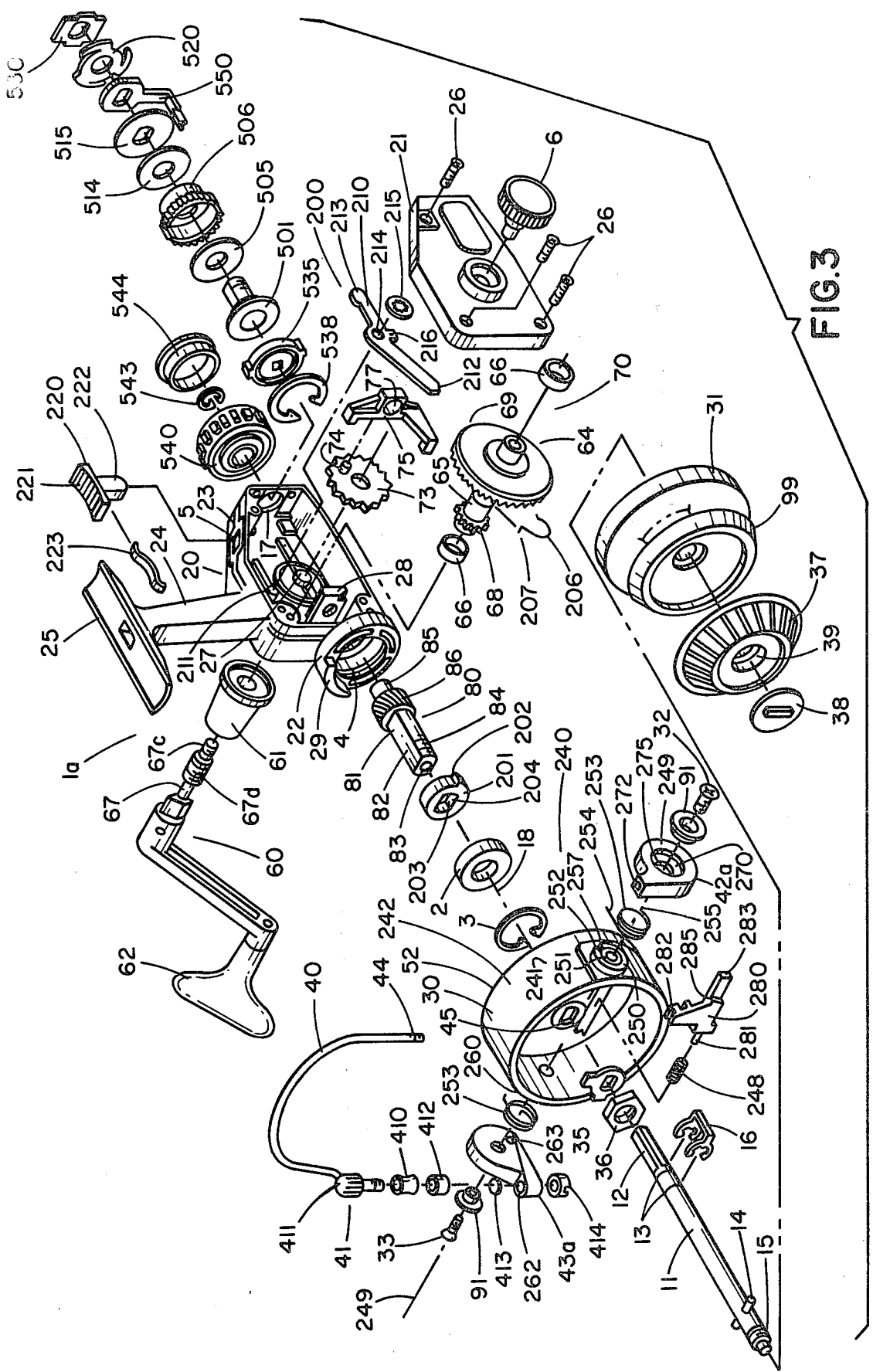
FIG. 3 is an exploded perspective view of the conventional style spinning reel containing the invention described herein.
Figure 6:
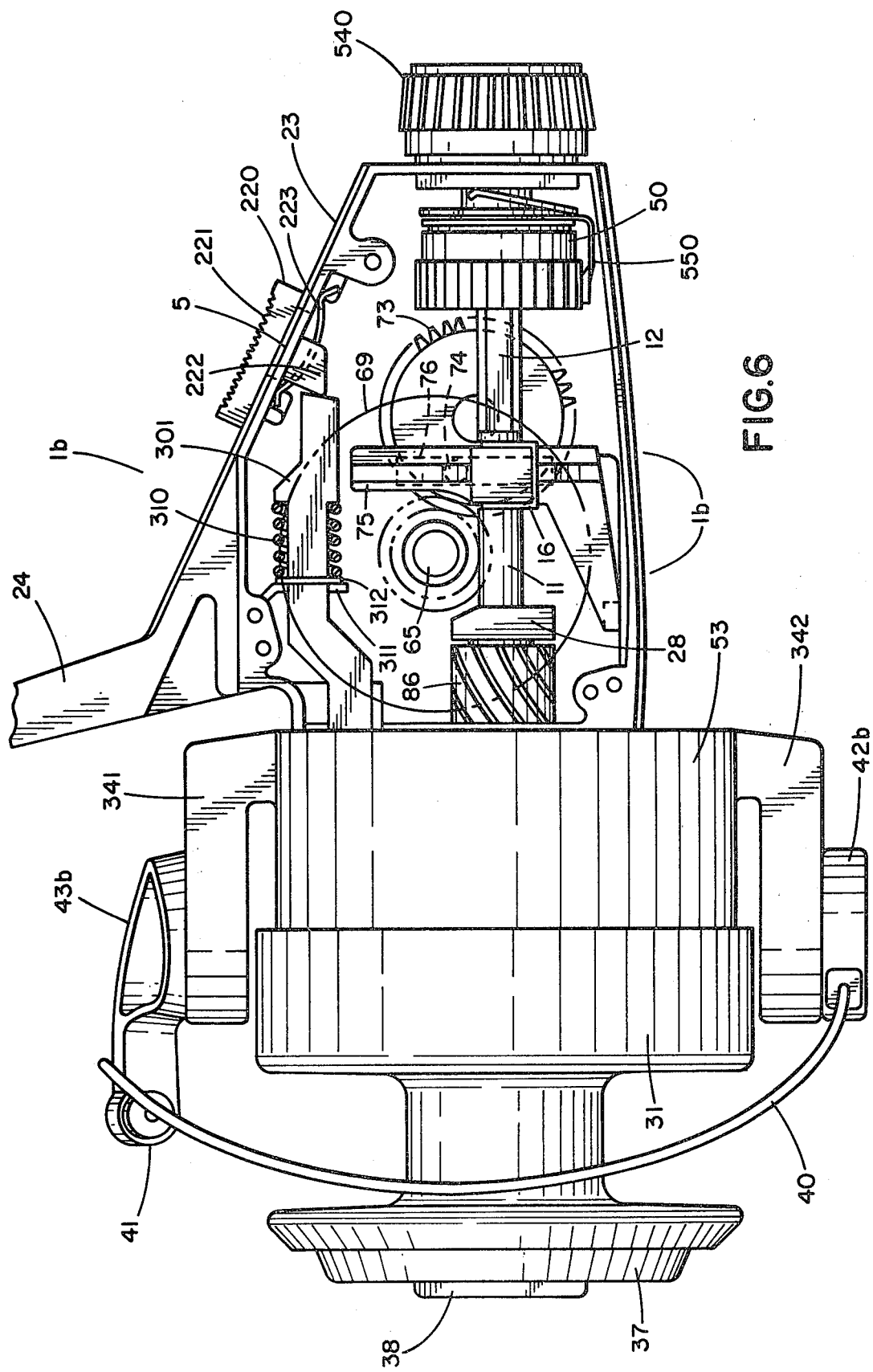
FIG. 6 is a cutaway side view of the skirted style spinning reel depicting the relative location of some of the parts of the reel.
Figure 7:
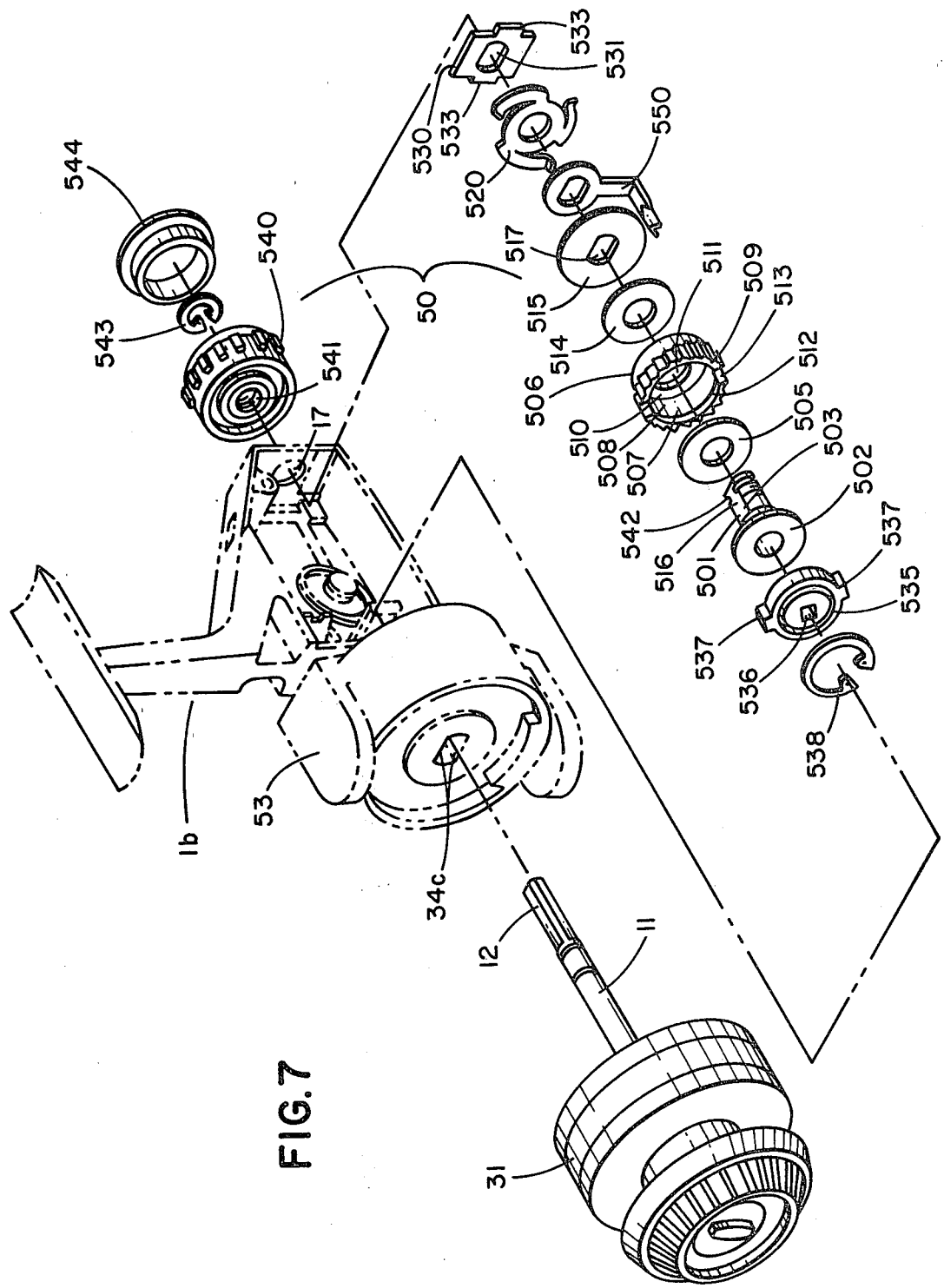
FIG. 7 is an exploded perspective view of the skirted style spinning reel shown in phantom and the drag mechanism shown in detail.

Contrary to standard spinning reels that have their drag associated with the front spool or locked into the back portion of the housing, the drag mechanism 50 is free-floating (it is self-contained as a unit and not captured in the housing). As best seen in FIGS. 3 and 7, the drag housing cup 506 has an internal cavity 507 with a back closure 510 with a concentric hole 511 therein. A first flat friction disc washer 505 with a round hole fits inside cup 506. The drag adjustment screw 501 with elongated shank 503 having a threaded portion at one end and side flats 516 is positioned so that the shank 503 extends out the back side of the closure 510. The disc 505 being captured between closure 510 and the washer portion 502 of the screw 501. A disc drive 535 with lugs 537 fits into the cup cavity 507 with the lugs 537 fitting in notches 513. Retainer clip 538 is secured to the front groove 512 to prevent the drive 513 from becoming disassembled from the cup 506. On the rearward extending shaft 503 a second friction disc 514, a flat washer 515 with hole 517 that matches the cross section of the shaft 503, a disc spring 512 and a rectangular aligning plate 430 with hole 531 similar to 517 is placed thereon. In one embodiment of the invention, clicker 550 is placed on the shank as shown in FIGS. 3, 5, 6 and 7. This compact unit comprises the forward portion of the drag mechanism 50 that is contained within the gear case 23. The remaining portion of the shank 503 slips through hole 17 at the back of the housing 20. Adjustment knob 540 is secured on the shaft 503 by means of internal nut 541 and locked in place by positioning retainer 543 in groove 542.

The square end 12 of the shaft 11 slip fits into hole 536. When the knob 540 is tightened against the housing case 23, spring 520 becomes trapped between the plate 530 and the washer 515. As the knob 540 is further tightened, the friction discs 505 and 514 clamp the back closure 510 tighter and tighter thereby preventing the cup 506 from rotating. Since the square end 12 of the shaft 11 is keyed to the drive 535 and the rectangular shape of plate 530 and the lugs 533 prevent the mechanism 50 from rotating inside the gear case 23, the shaft 11 is thereby prevented from rotating; thus, the drag is fully functional and there is no rotational movement of the spool 31. When the knob 540 is loosened, there is less clamping force by the discs 505 and 514 and therefore limited rotation of the free-floating mechanism 50 is permitted which in turn permits limited rotation of the spool 31 when there is tension force on the line 10.

In a preferred embodiment of this invention, a unique drag spring 520 is located between the washer 515 and the alignment plate 530. The spring 520 is mounted on shaft 503 via hole 527. The central support 521 rests against the washer 515 and the fulcrum points 524 rest against the plate 530. However, if the washer 515 is sufficiently thick to support the points 524, the spring may be turned around, as desired. The radially extending spring arms 522 are radially spaced from the center support 521 so that they will not contact the clicker 550. The spring 520 comprises two step spring responses that are both linear. The first leaf spring 523 that is based in the support 521 ends with fulcrum point 524. The second and shorter leaf spring 525 starts at the fulcrum point 524 and terminates at end 526. When the drag is fairly loose, the spring 520 appears as is shown in FIG. 10 where the end 526 is substantially spaced from washer 515. As the knob 540 is tightened on shank 503, the distance between the end 526 and the washer 515 is reduced such as shown in FIG. 11. Up to this point the first leaf spring 523 is producing the force that clamps the back closure 510 between the friction discs 505 and 514. The knob 540 is again tightened and the end 526 contacts the washer 515 and the second leaf spring 525 becomes operative producing an even tighter clamping force as shown in FIG. 12. It may be observed that the first spring 523 is bent in a gentle arc and the angle between the fulcrum 524 and the end 526 is flattening out. Preferably, the spring 520 has three radial arms 522 approximately 120° apart although any number of arms can be accommodated if the space is sufficient. Preferably, the spring 520 is made from spring steel but other metals are acceptable. The location of the spring 520 being in the gear case 23 prevents it from being attacked by corrosive elements that may be picked up by the line 10 while it is in the water.

Figure 4:
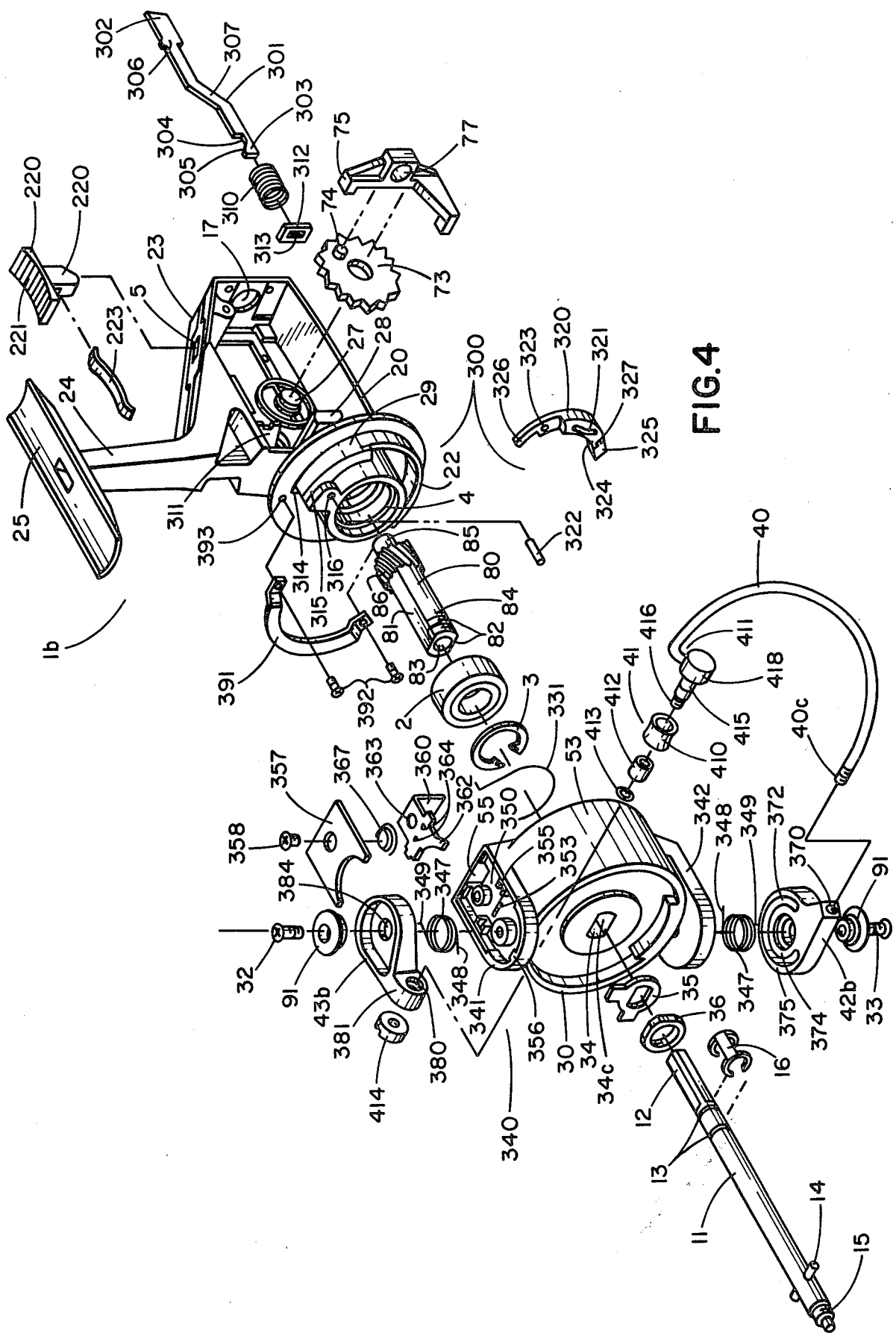
FIG. 4 is an exploded perspective view of the skirted style spinning reel not depicting some of the parts in common with the conventional reel shown in FIG. 3 but capable of incorporating the invention described herein.
Figure 5:
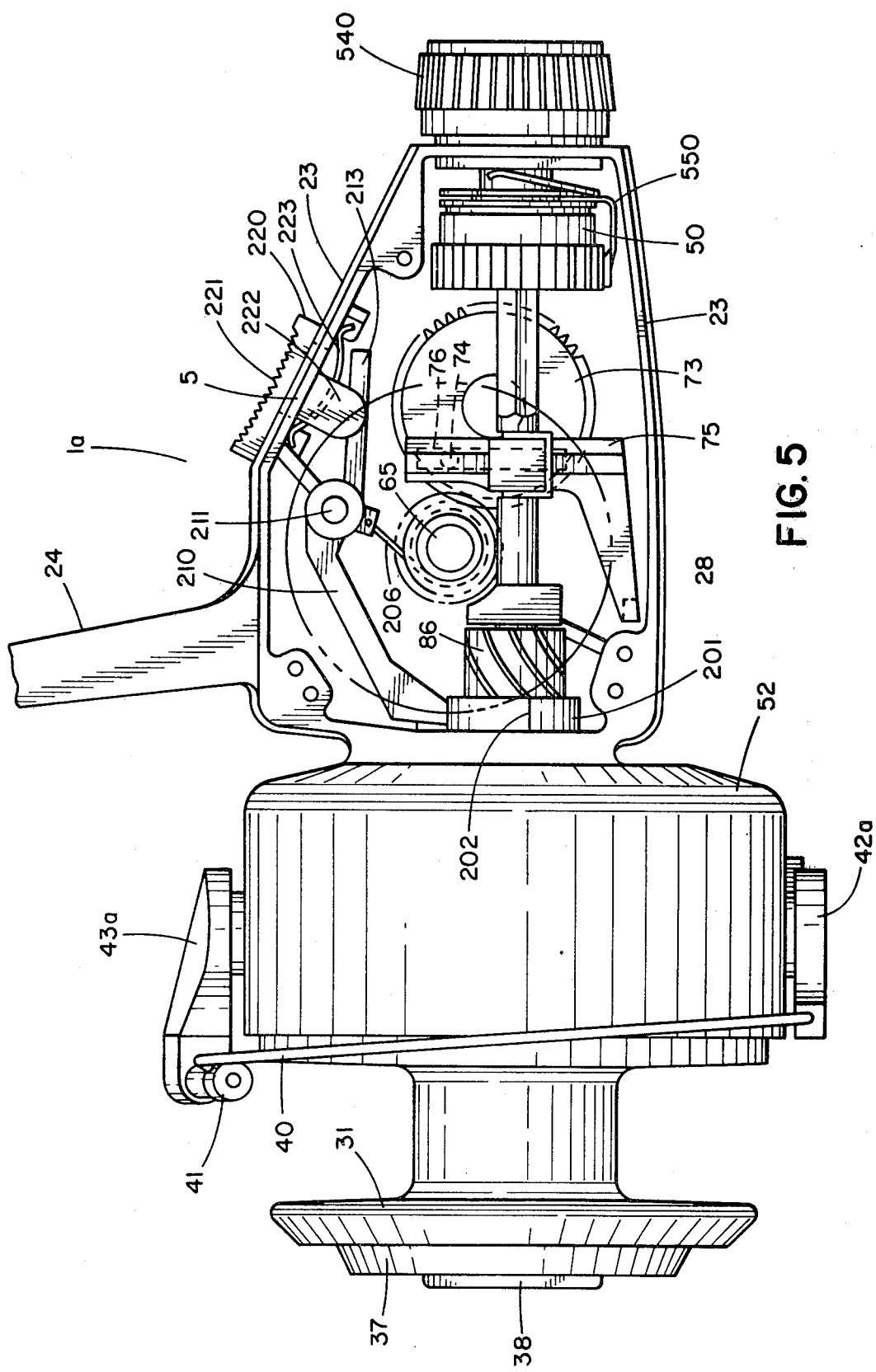
FIG. 5 is a cutaway side view of the conventional style spinning reel depicting the relative location of some of the parts of the reel.

A unique feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, 3 and 5, self-centering mechanism 200 is depicted and in the skirted reel 1b as shown in FIGS. 2, 4 and 6, the self-centering mechanism 300 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 53 and cooperates with the cam surface 29 on the front of the housing 20.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing with a hole at the back thereof, a center shaft mounted in the housing a spool mounted on the shaft for holding the fishing line, a handle and gear train assembly mounted in the housing, a rotor coaxially mounted on the shaft and rotatable by cooperative movement of the handle and assembly, and a movable bail mounted on the rotor having an open casting position and a closed retrieving position, a free-floating drag assembly keyed to the shaft to permit limited rotation thereof, as the drag is tightened the shaft is permitted to rotate less, and as the drag is loosened the shaft is permitted to rotate more freely, the drag having an adjustment screw with a washer portion and an elongated shank, a first disc and an alignment plate disc mounted on the shank, the shank extending through the back housing hole, means on the shank for tightening and for loosening the drag, a drag spring mounted on the shank between the first washer and the plate washer, the improved drag spring comprising:

a center support having a hole therein and mounted on the shank;

an arm having a first leaf spring portion and a second leaf spring portion and a fulcrum positioned therebetween, the first portion secured at a first end to the center support and extending radially and bent axially therefrom, and a second end secured to the fulcrum, the second leaf spring at a first end secured to the fulcrum with a second end extending freely and axially back toward the center support when the drag is loosened, the fulcrum axially spaced from the center support when the drag is in the loosened position, the center support being in contact with the plate disc and the fulcrum in contact with the first disc creating a light force on the drag in the loosened position; tightening the drag from the loosen position deflects the first portion linearly and creates an increased force on the drag that prevents the shaft from rotating, and continued tightening of the drag causes the second end of the leaf spring to contact the first washer providing for dual spring contact comprising the first and second leaf spring portions coacting to create an increased linear force on the drag thus further limiting the ability of the shaft to rotate; the second leaf spring portion having a linear force independent of the first portion.

* * * * *